W. M. FULTON.
DAMPER.
APPLICATION FILED JULY 5, 1916.

1,331,100.

Patented Feb. 17, 1920.
2 SHEETS—SHEET 1.

Inventor
Weston M. Fulton
By Mauro, Cameron, Lewis & Massie
Attorneys

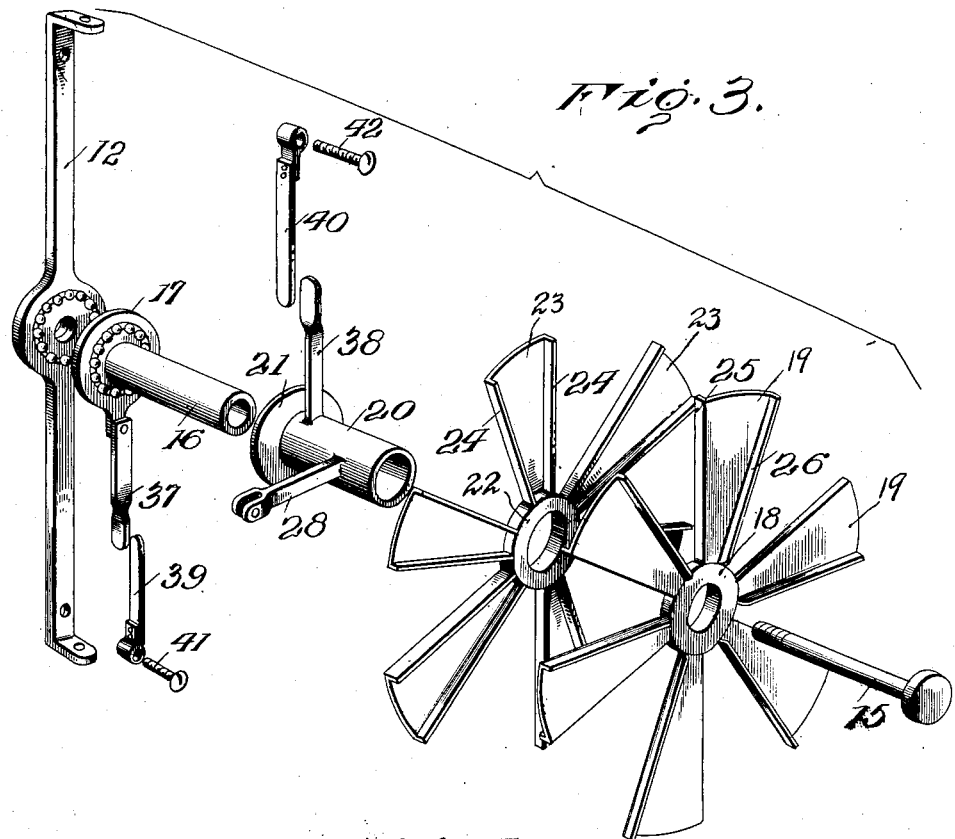
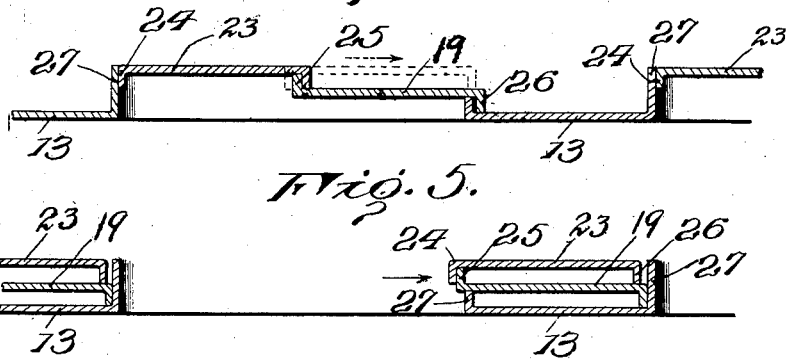
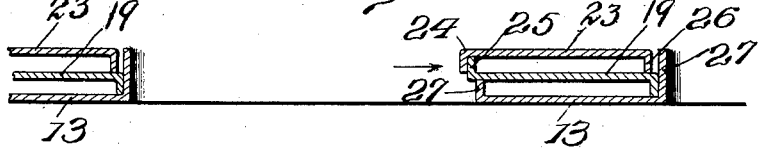

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

DAMPER.

1,331,100.  Specification of Letters Patent.  Patented Feb. 17, 1920.

Application filed July 5, 1916. Serial No. 107,661.

*To all whom it may concern:*

Be it known that I, WESTON M. FULTON, a citizen of the United States of America, and a resident of Knoxville, Tennessee, have invented a new and useful Improvement in Dampers, which invention is fully set forth in the following specification.

This invention relates to devices for regulating the passage of air, and more particularly to such devices in combination with radiators for the purpose of regulating the passage of air through the radiator. This invention has especial utility when used in combination with a radiator in the cooling system of an automobile engine, and will hereafter be described in its application to such use, but it is to be expressly understood that the invention is susceptible of wider application and its particular use described is for purposes of illustration only.

It has heretofore been proposed to provide the radiator of an automobile with a damper device which may or may not be detachable. For the purpose of regulating the admission of air to the radiator, it has further been proposed to connect the operating means of such damper device with a thermostat subjected to the temperature of the cooling system of the automobile engine, whereby, through the operative connections between the damper device and the thermostat, the admission of air to the radiator is controlled by the temperature of such system.

The devices of this type heretofore devised have been open to a variety of grave objections. Such devices ordinarily have been provided with a large number of pivoted shutters; the numerous pivotal mountings of these shutters, however, become readily clogged with dust and dirt collected by the automobile, and are furthermore easily clogged by rust, with a resultant interference with their proper operation. It is an object of this invention to minimize the number of pivotal mountings and therefore the likelihood of interference with the operation of the damper device by rust or the collection of dust and dirt while retaining a relatively large admission of air when the damper device is wide open.

Devices heretofore constructed have also been difficult to balance, and any failure to exactly balance the movable elements of the damper device has resulted in a fluttering or rapid oscillatory movement of such elements when the automobile is running, producing a disagreeable noise and interfering with the proper operation of the device. It is an object of this invention to provide a construction which is self-balancing and which guards against oscillatory movements interfering with its proper operation without unduly interfering with the passage of air therethrough.

Further objects of the invention relate to the provision of a construction which is more nearly air-tight when the damper is closed than those heretofore provided, which is easily constructed and assembled, and which provides a larger admission of air in wide-open position than the automatic dampers heretofore used. Other objects will appear as the description proceeds.

Stated broadly, the damper device comprises, in combination with means providing apertures for the passage of air, a plurality of sets of closure members adapted to open and close said apertures, each of said sets comprising relatively immovable members and said sets being relatively movable and suitably interengaged to operate in succession. Said closure members have their movement in planes parallel to the plane of said apertures and are preferably rotatable about a common axis.

The invention is capable of receiving a variety of mechanical expressions, and while one embodiment of the invention has been shown with considerable particularity on the accompanying drawings, it is to be expressly understood that such has been done for purposes of illustration only and that the form shown is not to be construed as a definition of the limits of the invention, reference being had to the appended claims for that purpose.

Referring to the drawings, wherein the same reference characters designate corresponding parts in the several figures—

Fig. 3 is a perspective view of the several elements within the damper shell or casing shown in separated relationship;

Figs. 4 and 5 are diagrammatic views illustrating the damper elements in closed and open relationship respectively.

Figure 1:
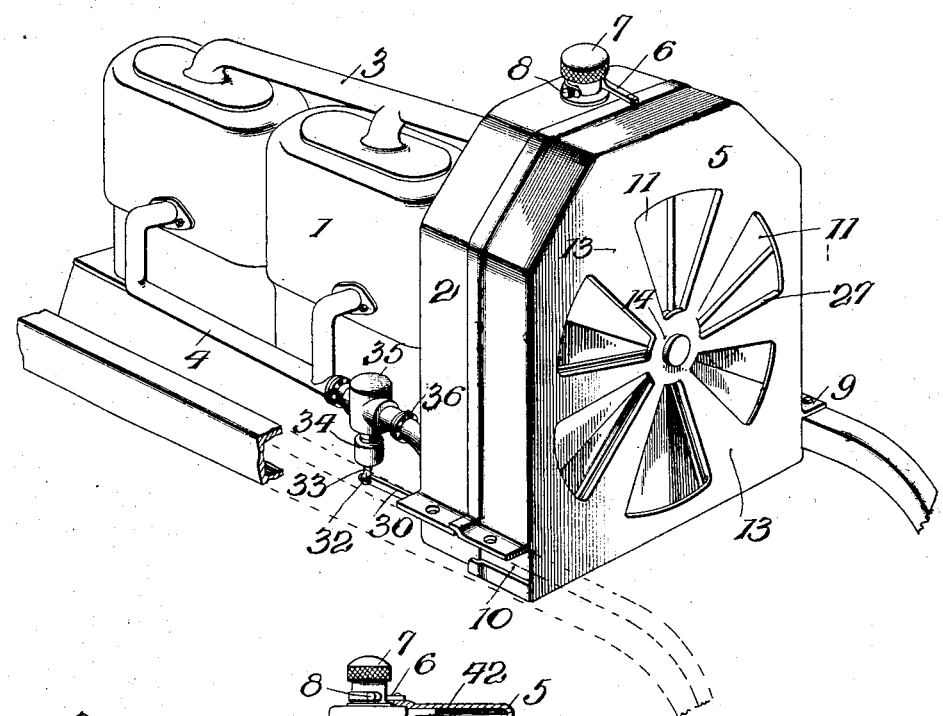
Figure 1 is a perspective view of an automobile engine and its radiator, with a damper device embodying the present invention attached.
Figure 2:
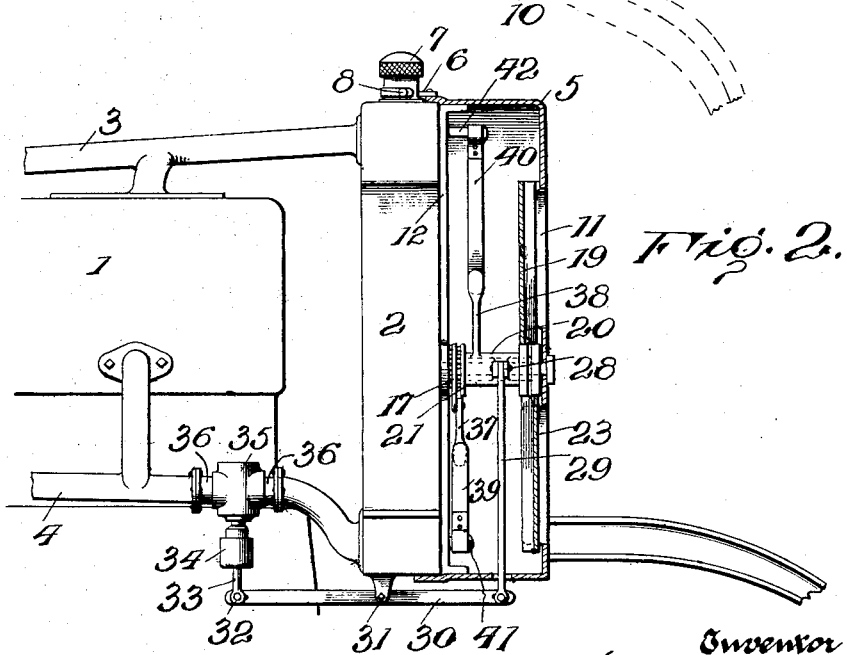
Fig. 2 is a vertical longitudinal section through the damper device.

Referring to the drawings, 1 indicates any conventional form of automobile engine, the same being provided with the usual cooling system comprising jackets about the engine cylinders, a radiator 2, and pipes 3 and 4 respectively leading to and from the radiator for the circulation of the water from the jackets of the engine cylinders to and through the radiator, where it is subjected to the cooling influence of the air.

In starting the engine, and particularly in cold weather, it is desirable that the air be not admitted to the radiator to cool the water circulating through the system until the engine cylinders and the water in the cooling system have risen to the desired operating temperature. Thereafter, it is desirable that air be admitted to the radiator in proportion as the water flowing through the system tends to rise in temperature, so that said cooling medium may be brought back substantially to such predetermined temperature. To provide a damper device that shall serve the above purpose, a shell or casing 5 is disposed in the path of the air flowing through the radiator, such shell or casing preferably taking the shape of the front face of the radiator and being mounted thereon. In order that this shell or casing may be readily removed in warm weather when its use may be unnecessary, it is preferably made readily detachable, and to this end a strap 6 is shown for attaching the upper end of the shell to the nipple 7 of the radiator, the attachment being conveniently obtained by the use of a set-screw at 8. To maintain the shell or casing rigidly in its proper position, it is preferably provided with flanges 9 and 10, which may conveniently be angle irons attached to the shell or casing, such flanges being provided with apertures for receiving bolts whereby the shell or casing may be rigidly secured to the frame of the automobile. Such shell or casing may be conveniently constructed by pressing the same up from sheet-metal.

In the form shown, the front face of this shell or casing is provided with a plurality of apertures 11, these apertures preferably radiating from a point at the approximate center of the front face and increasing in width from the center outward. In the rear of this shell or casing is provided a cross-bar 12 extending approximately parallel to the front face and shown as disposed opposite a pair of solid portions 13 between said apertures 11. Supported by this cross-bar 12 and the central portion 14 of the front face of the casing is a pin or bolt 15 which may conveniently be screw-threaded for reception in the cross-bar 12, or may take the form of a rivet. Supported on this pin 15 in the form shown is a sleeve 16 bearing at one end 17 against the central enlarged portion of the cross-bar 12, and carrying at its opposite end by means of the collar 18 a plurality of circumferentially spaced closure members for the aforesaid apertures 11, such closures taking the form of radiating vanes 19. Supported on the sleeve 16 is a second sleeve 20 bearing at one end 21 against the enlarged end 17 of the sleeve 16, and carrying at its opposite end by means of the collar 22 a plurality of circumferentially spaced closure members which are also in the form of radiating vanes 23. Each plurality of vanes 19 and 23 thus constitutes a unitary set of relatively immovable closure members for said apertures 11. To reduce friction and provide for the easy movement of the closures, ball-bearings may be provided between the enlarged portion 17 of sleeve 16 and the enlarged portion of the cross-bar 12, or between the enlarged portions 17 and 21 of the aforesaid sleeves, or at both of these points. The vanes 19 and 23 are preferably made by pressing the same from sheet-metal.

It is apparent that if but one sleeve with its closure members were employed for opening and closing the apertures 11, such apertures could be no wider than the closed portions between them, else closures of the width of the apertures would, in open position, overlap the apertures, and the latter never become wide-open. In order to obtain a maximum area of apertures and therefore reduce the width of the closed portions between them, a plurality of closure-carrying members has been provided, as described. In the embodiment illustrated, each of the vanes 19 and 23 is slightly more than one-half the width of an aperture 11 at any given point in its length, whereby the closed portions 13 between such apertures need be but slightly more than one-half the width of the apertures.

To provide for the progressive opening of the apertures, means are provided whereby one set of vanes gradually opens while the other set remains stationary until such time as the first set has moved to wide-open position. Thereafter, further movement of the first set produces a corresponding movement of the second set until the second set is moved to wide-open position. Similarly a progressive closing of the apertures 11 is obtained by the reverse movement of the vanes. While any suitable means may be employed for accomplishing this purpose, in the embodiment shown the several vanes are provided with interengaging portions, such portions serving the further function of rendering the vanes more rigid in construction and the device more nearly air-tight. Each vane of the inner set is provided on each of its edges with an outwardly directed flange 24. Each vane of the outer set is provided on one edge with an inwardly directed flange 25 and on its other edge with an outwardly directed flange 26. Each side of each aperture in the front face of the shell or casing is provided with an inwardly directed flange 27. These flanges may be conveniently stamped up from the material of the vanes and casing wall if the same are made of sheet metal.

Referring now to Fig. 4, which shows the vanes in closed position, it will be observed that the flanges 27 constitute a positive stop, preventing the vanes from moving beyond the closed position. As the inner set of vanes 23 opens, the outer set of vanes 19 remains stationary until the outwardly directed flanges 24 engage the inwardly directed flanges 25. Thereafter, further movement of the inner set of vanes 23 produces a corresponding movement of the outer set of vanes 19 until the outwardly directed flanges 26 engage the stationary flanges 27, whereupon the vanes are prevented from movement beyond their wide-open position. It will further be observed that, when the vanes are in closed position, the interengaging flanges provide substantially air-tight joints which resemble, in certain particulars, a labyrinth packing, inasmuch as the air must change its direction of travel a plurality of times in order to pass from the front to the rear of the vanes.

For actuating the closure members of the damper device, the outer sleeve 20 in the form shown is provided with a crank-arm 28, to which is pivotally connected a link 29, in turn pivotally connected to one end of a walking-beam 30. The walking-beam 30 is pivotally mounted at 31 as from a lug provided on the radiator casing. The opposite end of the walking-beam 30 is pivotally connected at 32 to the actuating member 33 of a thermosensitive device 34 positioned in a casing 35 through which the fluid of the cooling system passes in its return from the radiator to the jackets, but obviously the thermosensitive device could be positioned as well at any other suitable point of the cooling system. In order that the thermosensitive device may be readily detached when the damper device is not to be used, the casing 35 is preferably provided in a separable section of pipe 36, whereby it may be removed and a section of piping 4 substituted.

In order to prevent rattling or rapid oscillatory movement of the closure members due to the passage of air through the damper, the sleeves 16 and 20 are preferably provided with radiating arms 37 and 38 respectively, upon which bear light leaf-springs 39 and 40 respectively. These springs may conveniently be mounted upon pins 41 and 42, respectively, secured to the cross-bar 12.

In order to prevent the shell or casing 5 marring the automobile radiator, the portions of the former which bear upon the latter are preferably provided with a facing of non-abrasive material, as rubber, (not shown). If desired, the interior of the shell or casing may also be provided with a lining of heat-lagging material.

Assuming that the shell or casing 5 has been mounted upon the radiator 2 and that the section of piping 36, carrying the casing 35 for the thermosensitive device 34, has been connected into the pipe 4 and that the engine has been started, as the engine cylinders heat, the water in the jackets will rise in temperature and a circulation will be started through the radiator 2. The thermosensitive device will be set so as not to respond at first to the increasing temperature. When the water of the cooling system has risen to the desired temperature, however, the thermosensitive device will respond to the increase in temperature and, through its actuating member 33, rock the walking-beam 30 on its pivot 31 to turn sleeve 20 by means of link 29 and crank-arm 28. Thereupon the closures 23 will begin to move with respect to the closures 19, admitting air to the radiator. A further increase in the temperature of the water in the cooling system will cause a proportionate further movement of the closures 23 until they are wide-open. Thereafter, further movement of the closures 23 will cause a corresponding movement of the closures 19 until the damper device is wide-open. Rapid oscillatory movement of the vanes or closures 19 and 23 will be prevented by the springs 39 and 40 which tend to dampen any oscillation set up in the closure members.

While the springs have been shown as opposing the movement of the damper members by the thermostat, it will be readily apparent that, by a different arrangement of the parts, they could be made to assist the movement of the closure members by such thermostat. It will be apparent furthermore, from the above description, that by the provision of a plurality of closures radiating from a single axis, the number of pivots is reduced to a minimum, and by the provision of the pivotal axis at substantially right angles to the plane of the front face of the casing, wind pressure upon the damper members does not tend to turn said members about this axis, but produces a thrust longitudinally of the axis which may be taken up by the thrust-bearing as illustrated. Also, the opening and closing of the closures for the apertures by shifting the same parallel to the front face of the casing about a common axis angularly related to such front face enables a construction which requires a minimum number of parts, which facilitates construction and assemblage and which insures ease of operation and maximum efficiency. Furthermore, the present invention enables a relatively large admission of air when the damper device is in wide-open position and a substantially airtight closure for the front of the radiator when said device is in closed position.

While the above embodiment has been described with considerable particularity, it is to be expressly understood that the invention is not limited thereto as the same is capable of receiving a variety of mechanical expressions some of which will readily suggest themselves to those skilled in the art. While a damper device has been described as provided with two sets of vanes, a larger number of sets with a corresponding increase in the size of the apertures 11 could be employed within the teaching of this invention. Furthermore, while the damper device has been described in combination with a thermosensitive control therefor, it is to be understood that a damper device without such thermosensitive control is embraced within the present invention. Also, it is to be expressly understood that the type of thermostat employed is entirely immaterial to the scope of this invention as any suitable thermostat is within its contemplation.

What is claimed is:—

1. In a damper for automobile radiators, means provided with radiating apertures adapted to be disposed in the path of air flowing through the radiator, interengaging sets of radiating closures for said apertures, and means to shift said closures to open and close said apertures.

2. In a damper for automobile radiators, means provided with apertures and adapted to be disposed in the path of air flowing through the radiator, a plurality of sets of relatively immovable members together constituting closures for said apertures and mounted for movement about an axis angularly related to said first-named means, and means to operate said members to open and close said apertures.

3. In combination with an automobile radiator, means provided with radiating apertures and disposed in the path of air flowing through said radiator, interengaging sets of radiating closures for said apertures, and a thermosensitive device operatively connected to said closures to operate the same.

4. In combination with an automobile radiator, means provided with apertures and disposed in the path of air flowing through said radiator, a plurality of sets of relatively immovable members together constituting closures for said apertures and mounted for movement about an axis angularly related to said first-named means, and a thermosensitive device operatively connected to said members to operate the same.

5. In a damper for automobile radiators, means provided with apertures and adapted to be disposed in the path of air passing through the radiator, interengaging sets of relatively immovable closure members for said apertures movable about a common axis, and a common means for moving said members to open and close said apertures.

6. In combination with an automobile radiator, a plurality of co-axial relatively rotatable unitary sets of members for varying the quantity of air passing through said radiator, and means operatively connected to said members to rotate the same.

7. In a damper for automobile radiators, means adapted to be disposed in front of the radiator, and provided with a plurality of apertures, and means comprising a plurality of sets of closures mounted for rotation about a single axis to open and close said apertures, said sets of closures having interengaging portions whereby movement of one set of closures beyond a predetermined limit produces a corresponding movement of the next adjacent set.

8. In a damper for automobile radiators, means adapted to be disposed in front of the radiator and provided with a plurality of apertures, and means comprising a plurality of sets of closures mounted for rotation about a single axis to open and close said apertures, said sets of closures and said first-named means having coacting projections whereby movement of one set of closures beyond a predetermined limit produces a corresponding movement of the next adjacent set and whereby said closures can move only within predetermined limits in either direction.

9. In a damper for automobile radiators, a shell adapted to be disposed in front of the radiator and provided in its front face with a plurality of apertures, a pin extending at an angle to said front face, and a plurality of concentric sleeves rotatably mounted on said pin and respectively carrying unitary sets of relatively movable closures for said apertures.

10. In a damper for automobile radiators, a shell adapted to be disposed in front of the radiator and provided in its front face with a plurality of apertures, a pin extending at an angle to said front face, and a plurality of concentric sleeves rotatably mounted on said pin and carrying a plurality of sets of relatively movable closures for said apertures, said sets of closures being provided with interengaging means whereby movement of one set beyond a predetermined limit produces a corresponding movement of the next adjacent set.

11. In a damper for automobile radiators, means adapted to be disposed in the path of air passing through the radiator and provided with a plurality of apertures, a plurality of interengaging sets of closures for said apertures mounted for movement parallel to said first-named means, and resilient means coacting with said closures to oppose rapid oscillatory movements thereof.

12. In a damper for automobile radiators, means provided with apertures and adapted to be disposed in the path of air flowing through the radiator, a plurality of sets of relatively movable interengaging members together constituting closures for said apertures and mounted for movement parallel to said first-named means, and means to move said closure members to open and close said apertures.

13. In combination with an automobile radiator, means provided with apertures and disposed in the path of air flowing through said radiator, a plurality of sets of relatively movable interengaging members together constituting closures for said apertures and mounted for movement parallel to said first-named means, a thermosensitive device, and a common operating connection between said thermosensitive device and said sets of closure members.

14. In a damper for automobile radiators, means provided with apertures and adapted to be disposed in the path of air flowing through the radiator, a plurality of interengaging sets of members adapted to operate in succession in opening and closing said apertures, and means for operating said members.

15. In a damper for automobile radiators, means provided with apertures and adapted to be disposed in the path of air flowing through the radiator, a plurality of relatively movable interengaging sets of members adapted to operate in succession in opening and closing said apertures, and a common means for operating said members.

16. In a damper for automobile radiators, means adapted to be disposed in the path of air flowing through the radiator and provided with a plurality of apertures, a plurality of closures provided with interengaging flanges on their longitudinal edges and adapted to open and close said apertures, and means to operate said closures.

17. In a damper for automobile radiators, means provided with apertures adapted to be disposed in the path of air flowing through the radiator, a plurality of sets of coaxially movable closures adapted to open and close said apertures, means whereby said sets of closures operate in succession in opening and closing said apertures, and means to operate said closures.

18. In a damper for automobile radiators, means adapted to be disposed in the path of air flowing through the radiator and provided with a plurality of apertures, means comprising a plurality of sets of circumferentially-spaced members for opening and closing said apertures, and a common means for operating said sets of members.

19. In a damper for automobile radiators, means adapted to be disposed in the path of air flowing through the radiator and provided with a plurality of radiating apertures of approximately double the width of the intervening portions, means comprising a plurality of closure members for each of said apertures for opening and closing the same, and means for operating said last-named means.

20. In a damper device, means providing a plurality of apertures, a plurality of relatively movable interengaging sets of coaxial closure members adapted to operate in succession in opening and closing said apertures, and a common operating means for said closure members.

21. In a damper for automobile radiators, apertured means adapted to be disposed in the path of air flowing through the radiator, means comprising a plurality of sets of circumferentially-spaced members adapted to open and close said apertures, and thermosensitive means for operating said members.

22. In a damper for automobile radiators, apertured means adapted to be disposed in the path of air flowing through the radiator, a plurality of sets of circumferentially-spaced members for opening and closing said apertures, means whereby said sets of members operate in succession in opening and closing said apertures, and means to operate said members.

In testimony whereof I have signed this specification.

WESTON M. FULTON.